No. 653,415. Patented July 10, 1900.
S. J. FORD.
BICYCLE ATTACHMENT.
(Application filed Feb. 23, 1900.)

(No Model.)

WITNESSES:
Susie M Hughes.
Alice A. Davee

INVENTOR
Stonewall J. Ford
BY
T. Sunderland
ATTORNEY

UNITED STATES PATENT OFFICE.

STONEWALL J. FORD, OF JACKSONVILLE, FLORIDA.

BICYCLE ATTACHMENT.

SPECIFICATION forming part of Letters Patent No. 653,415, dated July 10, 1900.

Application filed February 23, 1900. Serial No. 6,151. (No model.)

*To all whom it may concern:*

Be it known that I, STONEWALL J. FORD, a citizen of the United States, residing at Jacksonville, in the county of Duval and State of Florida, have invented certain new and useful Improvements in Bicycle Attachments, of which the following is a specification.

My invention relates to bicycles and similar devices of a skeleton type composed of a mere framework on wheels as a motor; and the object of my invention is to provide a box-cart attachment for holding small packages or articles, connected to the motor-bicycle by a novel, simple, and convenient coupling entirely removable from the motor-bicycle when the cart is not required for use. The coupling device between the motor-bicycle and the attachment-cart is of so simple and independent a character that it involves no structural alteration or addition to the motor-bicycle in any way whatsoever, so that the attachment may be coupled to any bicycle in a moment or detached therefrom without leaving any evidence of the association.

Figure 1:
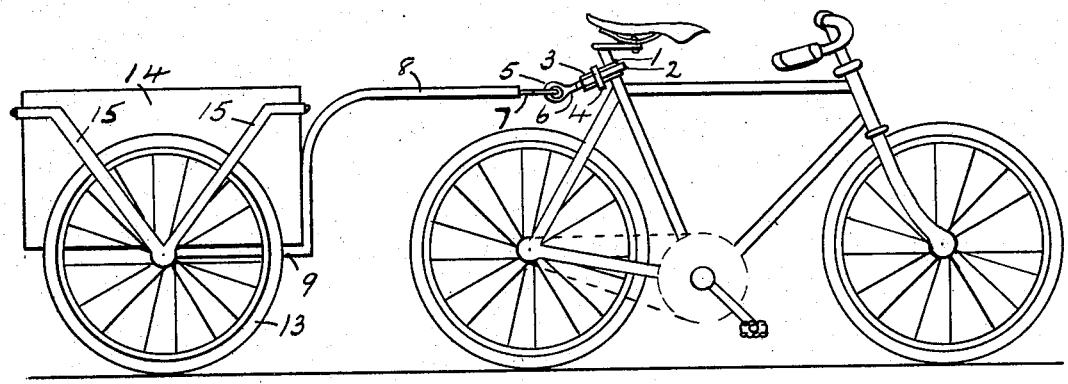
Figure 2:
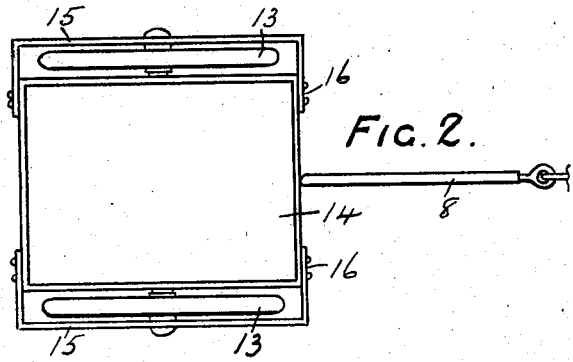
Figure 4:
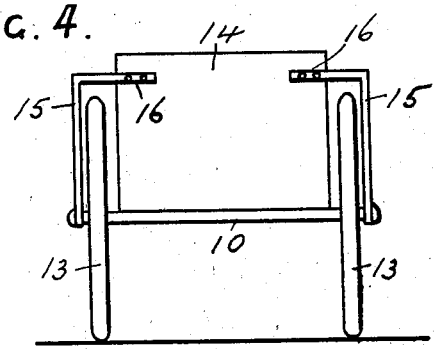
Figure 3:
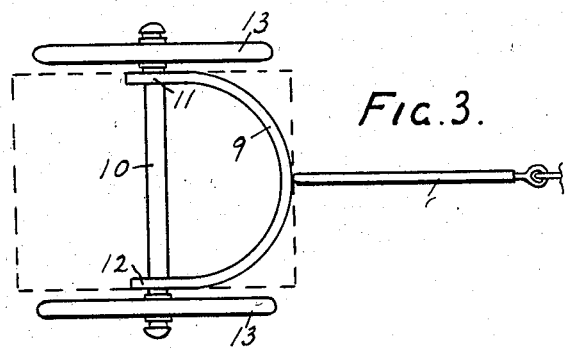
Figure 5:
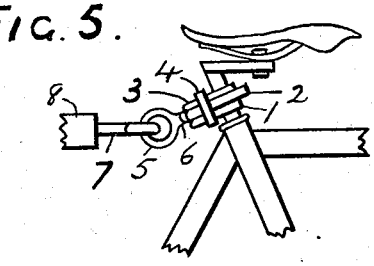
Figure 6:
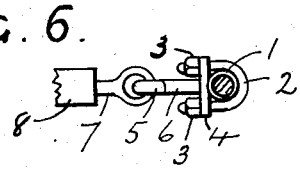

In the accompanying drawings, Figure 1 is a side elevation of both a motor-bicycle and the attachment. Fig. 2 is a plan of the attachment only. Fig. 3 is a plan of the under frame, axle, and wheels; Fig. 4, a rear elevation of the attachment, and Figs. 5 and 6 are enlarged details of the coupling device.

Similar figures refer to similar parts in the several views.

1 is a collar composed of leather, rubber, cloth, or other pliable and non-metallic substance bent around the seat-post of any ordinary bicycle, but not fastened thereto, the ends of said collar simply meeting together loosely.

2 is a yoke embracing the collar 1 to the extent of a semicircle, its two straight ends being threaded to receive the nuts 3.

4 is a plate connecting the ends of the yoke 2, against which the nuts 3 act. The said plate 4 completes the grip of the coupling device about the seat-post by coming into contact with the collar 1 when the nuts 3 are screwed up tight.

5 is a double-ring joint connected to the plate 4 by a shank 6, riveted to the plate, and connected by a shank 7 to the shaft or pole 8 of the cart. This double-ring joint is the only flexible feature of my novel invention.

9, Fig. 3, is a semicircular under frame or yoke fastened to the shaft 8 and to the axle 10 near its two ends 11 and 12.

13 indicates two ordinary bicycle-wheels working loosely on the ends of the axle 10.

14 is the box or cart-body of the attachment fastened to the frame 9 for holding small packages or articles.

15 indicates two wheel-guards, one on each side of the cart, which also serve the purpose of axle-stays and strengthen the entire machine. Each wheel-guard is made entirely in one piece, bent, as shown, is fastened to the end of the axle 10 outside the wheel, and is fastened to the cart 14 at the connections 16.

The operation of the machine is as follows: Small packages are carried from place to place in a cart on wheels by the application of the motive power of an ordinary bicycle applied through the coupling, comprising the parts 1, 2, 3, and 4, made with the seat-post of the bicycle, and thereby constituting the bicycle attachment.

Having thus described the nature of my invention, what I claim as new, and desire to secure by Letters Patent, is—

1. An attachment to a bicycle consisting of a D-shaped carrier-framework, an axle comprising part of said framework at each end of which is an ordinary bicycle-wheel working loosely, a shaft or pole fastened to said carrier-framework and connected by a flexible link to a coupling fastened to the seat-post of a bicycle, said coupling comprising a flexible collar which grasps the post, a yoke over the collar, a plate connecting the two ends of the yoke and two nuts for holding the coupling together about the seat-post substantially as described.

2. An attachment to a bicycle consisting of a shaft or pole fastened to a carrier-framework on wheels, a flexible link consisting of a double-ring joint 5 connecting said shaft to a coupling, said coupling being bolted to the seat-post of a bicycle by a yoke and a plate grasping the post and secured by two nuts substantially as shown.

3. An attachment to a bicycle consisting of a cart on wheels, the shaft or pole 8 fastened to the cart, the double-ring joint 5 fastened to the shaft, the coupling device fastened to the ring-joint 5 and bolted to the seat-post of a bicycle, said coupling device comprising a pliable collar 1, a yoke 2, a plate 4 connecting the two ends of the yoke and two nuts 3 for holding the coupling device together about the seat-post substantially as described.

4. An attachment to a bicycle consisting of a cart on wheels, the two wheel-guards or axle-stays 15 fastened to the cart and to the ends of the axle outside of said wheels, the shaft or pole fastened to the cart and connected by a flexible link to a coupling, said coupling comprising a collar, a yoke, a plate and two nuts arranged around and about the seat-post of a bicycle substantially as shown.

STONEWALL J. FORD.

Witnesses:
T. H. PARROTT,
T. SUNDERLAND.